Figure 1:
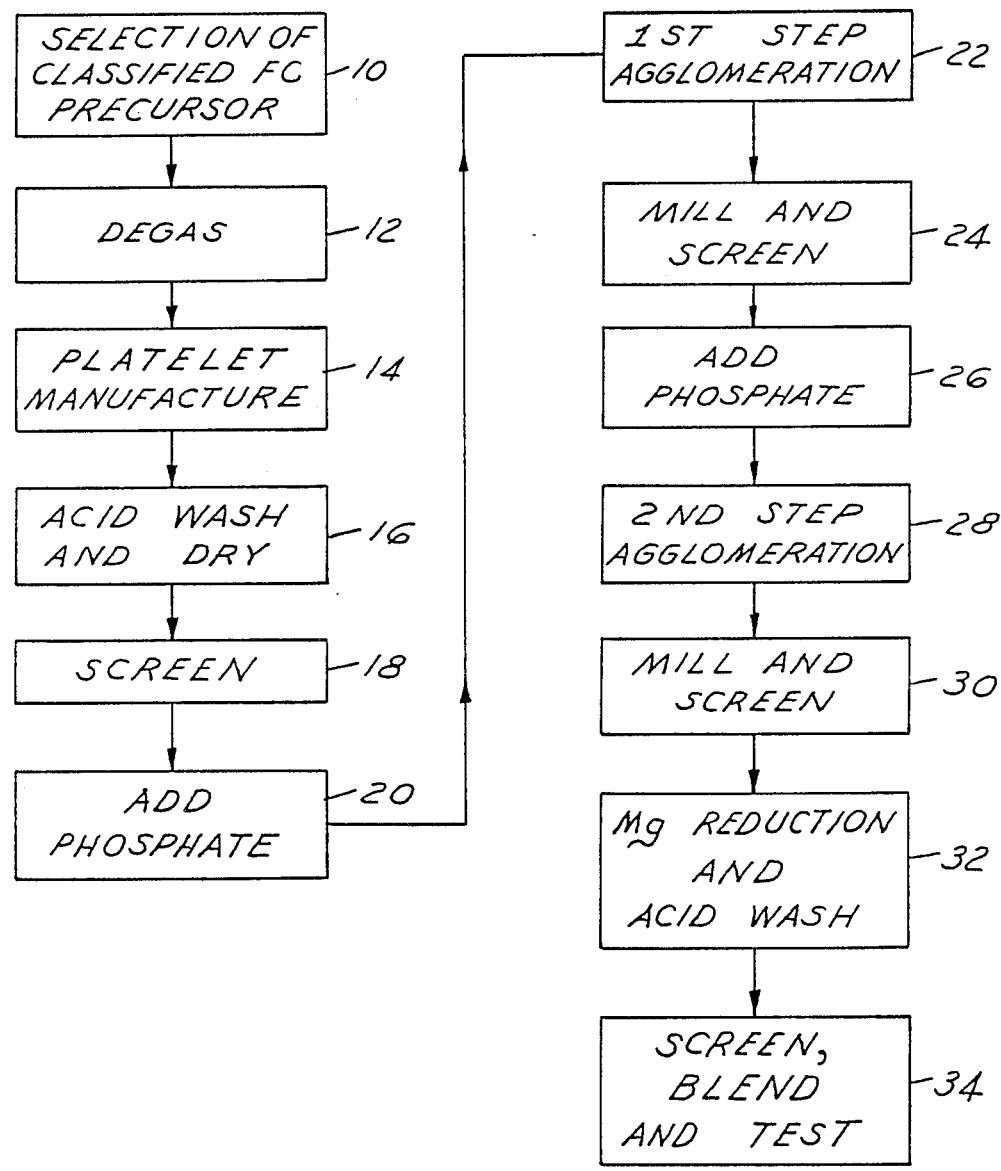

United States Patent [19]

Schiele

[11] Patent Number: 4,740,238
[45] Date of Patent: Apr. 26, 1988

[54] PLATELET-CONTAINING TANTALUM POWDERS

[75] Inventor: Edward K. Schiele, Gurnee, Ill.
[73] Assignee: Fansteel Inc., North Chicago, Ill.
[21] Appl. No.: 30,334
[22] Filed: Mar. 26, 1987
[51] Int. Cl.[4] .................................................. B22F 9/04
[52] U.S. Cl. .................................... 75/0.5 BB; 75/251
[58] Field of Search ............... 74/0.5 BB, 0.5 AB, 251
[56] References Cited

U.S. PATENT DOCUMENTS

| | | | |
|---|---|---|---|
| 4,231,790 | 11/1980 | Hähn et al. | 75/0.5 BB |
| 4,441,927 | 4/1984 | Getz et al. | 75/0.5 BB |
| 4,483,819 | 11/1984 | Albrecht et al. | 75/0.5 BB |
| 4,502,884 | 3/1985 | Fife | 75/0.5 BB |
| 4,684,399 | 8/1987 | Bergman et al. | 75/0.5 BB |

Primary Examiner—Wayland Stallard
Attorney, Agent, or Firm—Barnes, Kisselle, Raisch, Choate, Whittemore & Hulbert

[57] ABSTRACT

An ingot-derived unagglomerated (or preagglomerated) tantalum powder composition includes a platelet tantalum powder having an average FSSS of less than two micrometers, preferably in the range of 0.6 to 1.1 micrometers, a Scott density not greater than about 30 g/in$^3$, and a BET surface area of at least 0.7 m$^2$/g. In one embodiment of the invention, such powder is agglomerated and milled to form a tantalum powder product having a particle size of about 2 to 3 micrometers, a BET surface area of about 0.43 m$^2$/g, a Scott density in the range of 18 to 27 g/in$^3$.

8 Claims, 3 Drawing Sheets

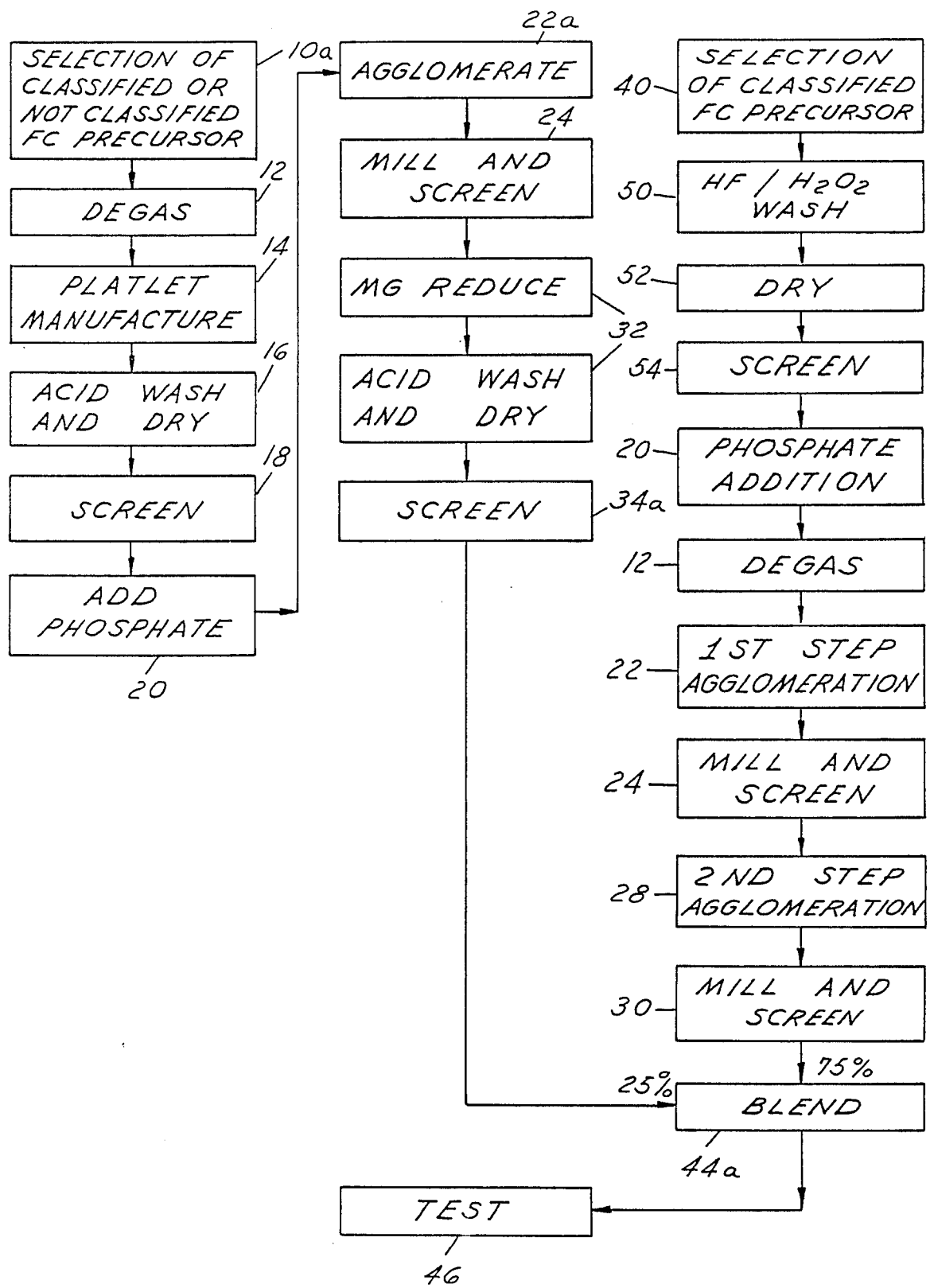

PLATELET-CONTAINING TANTALUM POWDERS

The present invention is directed to tantalum powders which are adapted for fabrication into anodes for electrolytic capacitors.

Use of tantalum powders for preparation of anodes in electrolytic capacitors is generally well-known. Such anodes or electrodes are produced by compacting the tantalum powder to provide a coherent shape, sintering the compact, and subsequently forming a continuous dielectric oxide film on the sintered product. Flowability and green strength are physical characteristics of a tantalum powder which are important for economical anode manufacture. Likewise, chemical purity and powder surface area are important considerations in electrical properties of the resulting anode. Unfortunately, steps taken to improve one or more powder properties, or to accommodate less-than-ideal powder properties during anode manufacture, usually adversely affect other powder and/or anode characteristics.

One approach toward achieving improved specific charge or capacity (CV/g or $\mu$fv/g) in tantalum powders for electrolytic capacitors is to modify the particle shape or morphology. U.S. Pat. No. 3,647,415 discloses a tantalum powder for electrolytic capacitors in which the tantalum powder has an average flakiness of 2 to 60, at least 80 percent by weight (w/o) of the powder consisting of particles having a shorter breadth of 3 to 250 micrometers and being free of particles having a shorter breadth of more than about 500 micrometers. U.S. Pat. No. 4,441,927 discloses an ingot-derived tantalum powder composition for electrolytic capacitors comprising a granular tantalum powder having a particle size less than 10 micrometers mixed with about 20 to 40 weight percent (w/o) of a flaked tantalum powder having a BET surface area of about 0.20 to 0.40 $m^2/g$. Improved surface area, satisfactory green strength, resistance to surface area loss during sintering, and resulting improved electrical characteristics are asserted. The flaked powder is produced by milling an electron-beam (e-beam) melted ingot-derived tantalum particulate having a size range of 10 to 44 micrometers. U.S. Pat. No. 4,555,268 suggests pre-agglomerating the flaked powder prior to mixing with the granular powder to improve handling characteristics.

In accordance with a first important aspect of the present invention, an ingot-derived unagglomerated (or preagglomeration) tantalum powder composition includes a platelet tantalum powder having an average Fisher sub-sieve size (FSSS) of less than two micrometers, preferably in the range of about 0.6 to 1.1 micrometers, a Scott density not greater than about 30 $g/in^3$, and a BET surface area of at least 0.7 $m^2/g$. In one embodiment of the invention, such powder is agglomerated and milled to form a tantalum powder product having a particle size of about 1.0 to 3.0 micrometers, a BET surface area of at least about 0.43 $m^2/g$, and a Scott density in the range of 18 to 27 $g/in^3$.

In other embodiments of the invention, the unagglomerated platelet powder is mixed with granular tantalum powder, preferably of tetrahedral morphology. The platelet and granular powders are agglomerated, either separately or as mixed. The resulting platelet/granular composition has at least 25 w/o platelet powder and a BET surface area of at least 0.4 $m^2/g$. The composition as a whole has a Scott density of at least about 25 $g/in^3$, a porosity of at least about 0.7, a composite FSSS of at least about 2.4 micrometers, and an oxygen content of not more than about 2000 ppm.

Figure 2:
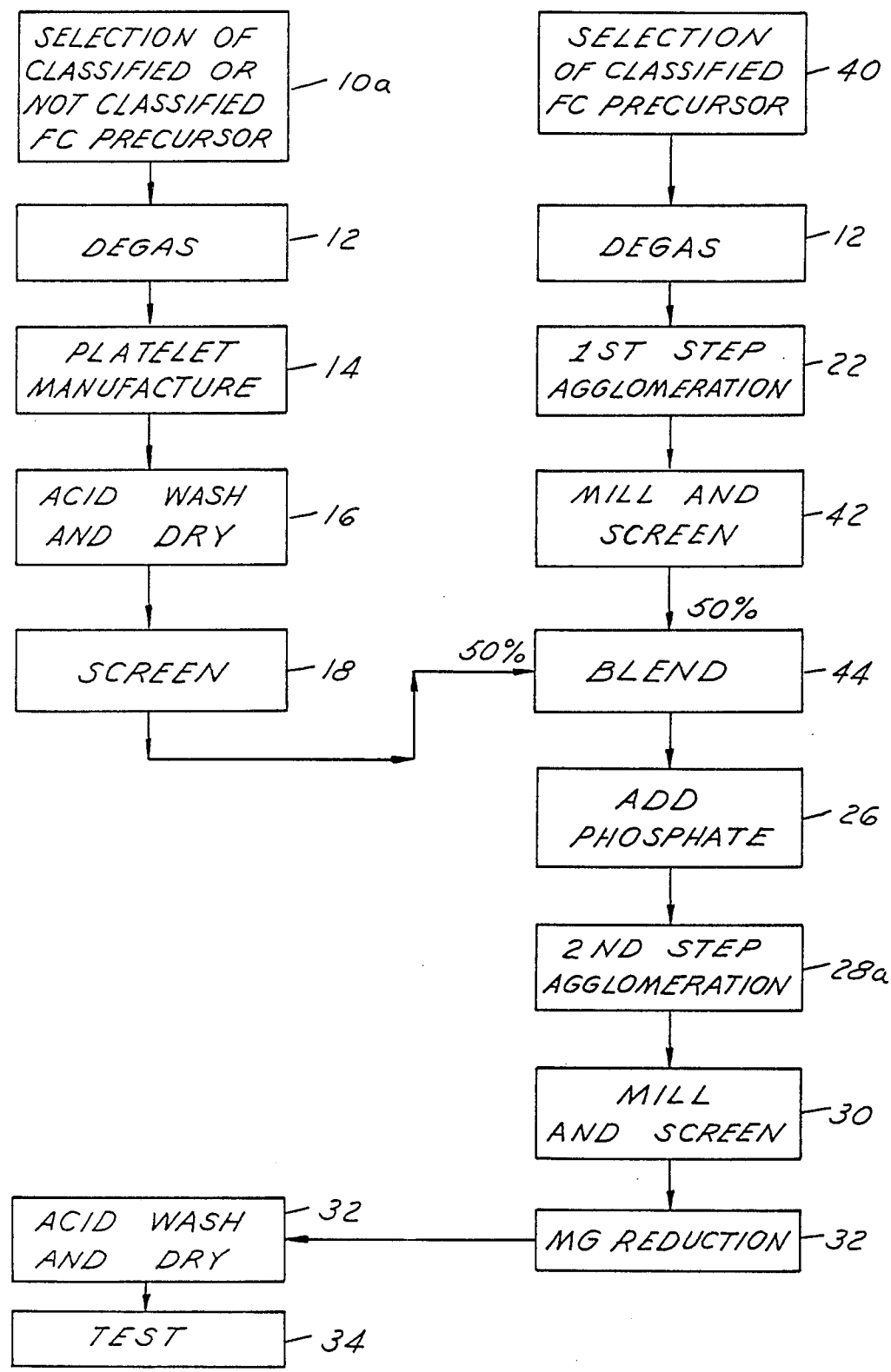

The invention, together with additional objects, features and advantages thereof, will be best understood from the following description, the appended claims and the accompanying drawings in which:

FIGS. 1–3 are flow charts which illustrate manufacture of platelet-containing tantalum powders in accordance with three respective preferred embodiments of the invention.

Referring to FIG. 1, a precursor is first obtained (10), preferably by classifying an e-beam melted ingot-derived powder which has been embrittled by exposure to hydrogen gas at elevated temperature. The particulate precursor is preferably classified to about 1.75 micrometers Fisher sub-sieve size (FSSS) obtained by triple-melting the starting ingot in typically three cycles of e-beam purifications, hydriding and milling the resulting ingot to a granular powder precursor. The granular precursor is then degassed (12) to remove absorbed hydrogen. Platelet powder is manufactured (14) in a ball milling operation of extended duration, such as 14 hours. Most preferably, this milling operation is performed on a slurry which consists of the degassed precursor powder in a solvent, preferably 1-1-1 trichloroethane. This particular solvent is believed to yield enhanced results. The slurry is placed in an essentially pure tantalum vessel and milled with essentially pure tantalum balls in an otherwise conventional ball milling machine. The use of tantalum balls and vessel is believed to enhance purity of the resulting product. The resulting platelet powder, having a typical size of about 0.86 micrometers (FSSS), is acid washed (HF and $HNO_3$) and dried (16), and screened (18).

The platelet powder is then phosphate doped (20) up to 100 ppm elemental phosphorous, and agglomerated (22) for about one hour at 1325° C. The resulting cake is comminuted (24) to −35 mesh (ASTM standard), doped with additional phosphate (26) up to 100 ppm contained phosphorous, and reagglomerated (28) for about one hour at 1325° C. The resulting cake, having a FSSS of about 2.0 to 3.0 micrometers, is again comminuted (30) to −35 mesh. The resulting platelet powder has an elemental oxygen content in the range of about 4000–6000 ppm, which is unsatisfactory for production of capacitors. A magnesium reduction and acid wash operation (32) reduces the oxygen content to less than 2000 ppm and enhances electrical properties. The resulting platelet powder is then screened and tested (34), with results to be described in the following tables.

FIGS. 2 and 3 illustrate manufacture of mixed platelet and granular powder compositions in accordance with modified embodiments of the invention. In each process, stages identical to those hereinabove discussed are indicated by correspondingly identical reference numerals, and similar but modified stages are indicated by identical reference numerals followed by a suffix "a" or "b".

In FIG. 2, a granular precursor particulate having tetrahedral morphology is classified (10a) to a typical FSSS of 3.1 micrometers, and then degassed, ball milled to produce platelets, washed and screened as previously described. A second ingot-derived precursor in the size range of about 3.1 to 4.0 micrometers is classified (40), degassed (12), agglomerated (22) at 1375° C. for about one hour, and then milled and screened (42) to −200 mesh. The platelet powder resulting from screening stage 18 and the granular powder resulting from mill/-screen stage 42 are then blended (44) at a 1/1 weight ratio. The blend or mixture is phosphate doped (26) to 100 ppm elemental phosphorous, reagglomerated (28a), milled and screened (30), magnesium reduced (32), and acid washed and dried (32) for test (34).

FIG. 3 illustrates a process wherein the platelet powder product of FIG. 2, with phosphate added (20), a single agglomeration stage 22a at 1500° C. for about one hour, and subsequent magnesium reduction (32), is mixed at a ratio of up to 35 w/o with a twice-agglomerated and phosphate-doped granular powder of tetrahedral morphology. The latter powder is obtained by HF plus $H_2O_2$ washing (50) of a classified granular powder, drying (52) and screening (54) the resulting powder to −200 mesh, phosphate doping (20) up to 100 ppm contained elemental phosphorous, degassing (12) to remove hydrogen, and then the two-step agglomeration (22,28) followed by associated milling and screening (24,30) to −35 mesh. A blend (44a) containing typically 25 w/o platelet powder and 75 w/o granular powder is made and ready for testing (46).

Platelet powders produced at platelet manufacturing stage 14 in FIGS. 1–3, after acid washing and drying but before agglomeration, had physical characteristics listed in Table 1. As expected, the platelet powders produced at stage 14 of FIGS. 2 and 3 were essentially identical, while the platelet powder of FIG. 1 possessed lower Scott density and greater BET surface area (measured by the usual multi-point method) resulting from selection of a smaller precursor particle size (1.75 micrometers typical in FIG. 1 versus 3.1 micrometers typical in FIGS. 2–3). Following two-stage agglomeration, magnesium reduction, and subsequent steps, the platelet powder product of FIG. 1 possessed an average FSSS of 2.0 to 3.0 micrometers, average porosity of 0.835, Scott density in the range of 18 to 27 g/in$^3$, and typical BET surface area of 0.43 m$^2$/g. In the process of FIG. 3 where the platelet powder is subjected to agglomeration (22a) and milling (24) prior to blending (44a), the platelet powder resulting from screening stage 34a possessed an average FSSS of 2.0 micrometers, average porosity of 0.930, average Scott density of 13.5 g/in$^3$, and average BET surface area of 0.44 m$^2$/g.

Physical tests and chemical analysis of the final powder products of FIGS. 1–3 produced the results given in Table 2. Typical electrical properties of the final powder products manufactured according to FIGS. 1–3 are given in Tables 3–5 respectively.

TABLE 1

Physical Characteristics of As-Produced Platelet Powders

|  | FSSS (μm)/porosity | Scott Density (g/in$^3$) | BET Surface Area (m$^2$/g) |
| --- | --- | --- | --- |
| FIG. 1 | 0.6/0.827 to 0.9/0.784 | 10.55 to 21.8 | 1.44 to 1.077 |
| FIG. 2 | 0.6/0.827 to 1.1/0.770 | 10.55 to 25 | 1.44 to 0.764 |
| FIG. 3 | 0.6/0.827 to 1.1/0.770 | 10.55 to 25 | 1.44 to 0.764 |

TABLE 2

Physical Characteristics and Chemical Composition of Final Powder Products

|  | FIG. 1 | FIG. 2 | FIG. 3 |
| --- | --- | --- | --- |
| Physical Properties |  |  |  |
| FSSS (μm) | 2.5 | 2.4 | 4.4 |
| Porosity | 0.845 | 0.813 | 0.765 |
| Scott Density, g/in$^3$ | 25.52 | 26.06 | 39.05 |
| Flow Rate (Sec.) | 99 | 65 | 55 |
| Crush strength (pounds) for a 0.2605" dia. Cylindrical Pellet pressed to the following Density without binder |  |  |  |
| 4.5 g/cm$^3$ | N/T | N/T | 7.0 |
| 5.0 g/cm$^3$ | N/T | 10.7 | 14.0 |
| 5.5 g/cm$^3$ | 8.13 | 19.73 | 24 |
| 6.0 g/cm$^3$ | 15.80 | 33.30 | 39 |
| 6.5 g/cm$^3$ | 26.70 | +50 | +50 |
| 7.0 g/cm$^3$ | 42.30 | N/T | N/T |
| Chemical Composition Interstitial Elements (ppm) |  |  |  |
| $O_2$ | 1704 | 1451 | 2000 |
| $N_2$ | 35 | 44 | 86 |
| C | 40 | 75 | 115 |
| Metallics (ppm) |  |  |  |
| Fe | 15− | 15− | 15− |
| Ni | 15− | 15− | 15− |
| Cr | 15− | 15− | 15− |
| Others | 10− | 10− | 10− |
| Powder Particle Screen Mesh Distribution (%) |  |  |  |
| +80 | 21.7 | 16.0 | 20.6 |
| −80/+200 | 12.7 | 12.5 | 13.2 |
| −200/+325 | 10.5 | 10.5 | 6.7 |
| −325 | 55.1 | 61.0 | 59.5 |

(N/T = not tested)

TABLE 3

Typical Electrical Properties of Final Powder Products Produced According to FIG. 1

| Sinter Temperature/Time | 1500° C./30 minutes |
| --- | --- |
| Anode Weight, Size and Pressed Density | 1.0 gram, 0.213" diameter, 4.5 g/cm$^3$ |
| Formation | 100 volts in 0.01% $H_3PO_4$ at 90° C. |
| Test | 70 volts in 10% $H_3PO_4$ at 25° C. after 2 minute electrification |
| % Shr (diameter) | 0.0% |
| cv/gram | 20,738 |
| dcl - (μa/μfd − v) × 10$^{-5}$ | 25.96 |
| μa/g | 5.06 |
| Equivalent series resistance | 2.16 |
| Sinter Temperature/Time | 1550° C./30 minutes |
| Anode Weight, Size and Pressed Density | 1.0 gram, 0.213" diameter, 4.5 g/cm$^3$ |
| Formation | 100 volts in 0.01% $H_3PO_4$ at 90° C. |
| Test | 70 volts in 10% $H_3PO_4$ at 25° C. after 2 minute electrification |
| % Shr (diameter) | 2.23% |
| cv/gram | 17,775 |
| dcl - (μa/μfd − v) × 10$^{-5}$ | 15.35 |
| μa/g | 2.74 |
| Equivalent series resistance | 2.21 |
| Sinter Temperature/Time | 1600° C./30 minutes |
| Anode Weight, Size and Pressed Density | 1.0 gram, 0.213" diameter, 4.5 g/cm$^3$ |
| Formation | 100 volts in 0.01% $H_3PO_4$ at 90° C. |
| Test | 70 volts in 10% $H_3PO_4$ at 25° C. after 2 minute electrification |
| % Shr (diameter) | 4.3% |
| cv/gram | 15,213 |
| dcl - (μa/μfd − v) × 10$^{-5}$ | 15.5 |
| μa/g | 2.35 |
| Equivalent series | 2.36 |

TABLE 3-continued

Typical Electrical Properties of Final Powder Products Produced According to FIG. 1

| | |
|---|---|
| resistance | |
| Sinter Temperature/Time | 1600° C./30 minutes |
| Anode Weight, Size and Pressed Density | 1.0 gram, 0.213" diameter, 4.5 g/cm$^3$ |
| Formation | 150 volts in 0.01% $H_3PO_4$ at 90° C. |
| Test | 105 volts in 10% $H_3PO_4$ at 25° C. after 2 minute electrification |
| % Shr (diameter) | 3.75% |
| cv/gram | 14,313 |
| dcl - ($\mu a/\mu fd$ - v) × 10$^{-5}$ | 24.45 |
| $\mu a/g$ | 3.75 |
| Equivalent series resistance | 3.025 |
| Sinter Temperature/Time | 1700° C./30 minutes |
| Anode Weight, Size and Pressed Density | 1.0 gram, 0.213" diameter, 4.5 g/cm$^3$ |
| Formation | 200 volts in 0.01% $H_3PO_4$ at 90° C. |
| Test | 140 volts in 10% $H_3PO_4$ at 25° C. after 2 minute electrification |
| % Shr (diameter) | 9.45% |
| cv/gram | 9,694 |
| dcl - ($\mu a/\mu fd$ - v) × 10$^{-5}$ | 20.98 |
| $\mu a/g$ | 2.12 |
| Equivalent series resistance | 3.11 |
| Sinter Temperature/Time | 1800° C./30 minutes |
| Anode Weight, Size and Pressed Density | 1.0 gram, 0.213" diameter, 4.5 g/cm$^3$ |
| Formation | 200 volts in 0.01% $H_3PO_4$ at 90° C. |
| Test | 140 volts in 10% $H_3PO_4$ at 25° C. after 2 minute electrification |
| % Shr (diameter) | 12.4% |
| cv/gram | 7,991 |
| dcl - ($\mu a/\mu fd$ - v) × 10$^{-5}$ | 22.23 |
| $\mu a/g$ | 1.8 |
| Equivalent series resistance | 4.2 |
| Sinter Temperature/Time | 1900° C./30 minutes |
| Anode Weight, Size and Pressed Density | 1.0 gram, 0.213" diameter, 4.5 g/cm$^3$ |
| Formation | 270 volts in 0.01% $H_3PO_4$ at 90° C. |
| Test | 240 volts in 10% $H_3PO_4$ at 25° C. after 2 minute electrification |
| % Shr (diameter) | 16.3% |
| cv/gram | 5,132 |
| dcl - ($\mu a/\mu fd$ - v) × 10$^{-5}$ | 54.15 |
| $\mu a/g$ | 2.76 |
| Equivalent series resistance | 5.35 |

TABLE 4

Typical Electrical Properties of Final Powder Products Produced According to FIG. 2

| | |
|---|---|
| Sinter Temperature/Time | 1500° C./30 minutes |
| Anode Weight, Size and Pressed Density | 1.0 gram, 0.213" diameter, 5.5 g/cm$^3$ |
| Formation | 100 volts in 0.01% $H_3PO_4$ at 90° C. |
| Test | 70 volts in 10% $H_3PO_4$ at 25° C. after 2 minute electrification |
| % Shr (diameter) | 0.0% |
| cv/gram | 15,026 |
| dcl - ($\mu a/\mu fd$ - v) × 10$^{-5}$ | 26.5 |
| $\mu a/g$ | 3.95 |
| Equivalent series resistance | 3.15 |
| Sinter Temperature/Time | 1600° C./30 minutes |
| Anode Weight, Size and | 1.0 gram, 0.213" diameter, |

TABLE 4-continued

Typical Electrical Properties of Final Powder Products Produced According to FIG. 2

| | |
|---|---|
| Pressed Density | 4.5 g/cm$^3$ |
| Formation | 100 volts in 0.01% $H_3PO_4$ at 90° C. |
| Test | 70 volts in 10% $H_3PO_4$ at 25° C. after 2 minute electrification |
| % Shr (diameter) | 5.5% |
| cv/gram | 12,050 |
| dcl - ($\mu a/\mu fd$ - v) × 10$^{-5}$ | 12.5 |
| $\mu a/g$ | 1.5 |
| Equivalent series resistance | 2.55 |
| Sinter Temperature/Time | 1700° C./30 minutes |
| Anode Weight, Size and Pressed Density | 1.0 gram, 0.213" diameter, 6.0 g/cm$^3$ |
| Formation | 200 volts in 0.01% $H_3PO_4$ at 90° C. |
| Test | 140 volts in 10% $H_3PO_4$ at 25° C. after 2 minute electrification |
| % Shr (diameter) | 7.3% |
| cv/gram | 6,991 |
| dcl - ($\mu a/\mu fd$ - v) × 10$^{-5}$ | 13.26 |
| $\mu a/g$ | 0.91 |
| Equivalent series resistance | 5.7 |
| Sinter Temperature/Time | 1800° C./30 minutes |
| Anode Weight, Size and Pressed Density | 1.0 gram, 0.213" diameter, 6.0 g/cm$^3$ |
| Formation | 200 volts in 0.01% $H_3PO_4$ at 90° C. |
| Test | 140 volts in 10% $H_3PO_4$ at 25° C. after 2 minute electrification |
| % Shr (diameter) | 12.16% |
| cv/gram | 5,453 |
| dcl - ($\mu a/\mu fd$ - v) × 10$^{-5}$ | 8.85 |
| $\mu a/g$ | 0.48 |
| Equivalent series resistance | 5.6 |
| Sinter Temperature/Time | 1800° C./30 minutes |
| Anode Weight, Size and Pressed Density | 1.0 gram, 0.213" diameter, 6.0 g/cm$^3$ |
| Formation | 270 volts in 0.01% $H_3PO_4$ at 90° C. |
| Test | 240 volts in 10% $H_3PO_4$ at 25° C. after 2 minute electrification |
| % Shr (diameter) | 12.5% |
| cv/gram | 5,244 |
| dcl - ($\mu a/\mu fd$ - v) × 10$^{-5}$ | 51.26 |
| $\mu a/g$ | 2.68 |
| Equivalent series resistance | 6.75 |
| Sinter Temperature/Time | 1900° C./30 minutes |
| Anode Weight, Size and Pressed Density | 1.0 gram, 0.213" diameter, 6.0 g/cm$^3$ |
| Formation | 270 volts in 0.01% $H_3PO_4$ at 90° C. |
| Test | 240 volts in 10% $H_3PO_4$ at 25° C. after 2 minute electrification |
| % Shr (diameter) | 14.75% |
| cv/gram | 3,901 |
| dcl - ($\mu a/\mu fd$ - v) × 10$^{-5}$ | 56.25 |
| $\mu a/g$ | 2.19 |
| Equivalent series resistance | 5.2 |

TABLE 5

Typical Electrical Properties of Final Powder Products Produced According to FIG. 3

| | |
|---|---|
| Sinter Temperature/Time | 1800° C./30 minutes |
| Anode Weight, Size and Pressed Density | 2.0 gram, 0.258" diameter, 7.0 g/cm$^3$ |
| Formation | 200 volts in 0.01% $H_3PO_4$ at 90° C. |

TABLE 5-continued

Typical Electrical Properties of Final Powder Products Produced According to FIG. 3

| Test | 140 volts in 10% $H_3PO_4$ at 25° C. after 2 minute electrification |
|---|---|
| % Shr (diameter) | 6.22% |
| cv/gram | 5,040 |
| dcl - ($\mu a/\mu fd$ − v) × $10^{-5}$ | 11.55 |
| $\mu a/g$ | 0.58 |
| Equivalent series resistance | 2.96 |
| Sinter Temperature/Time | 1800° C./30 minutes |
| Anode Weight, Size and Pressed Density | 3.5 gram, 0.258" diameter, 7.0 g/cm$^3$ |
| Formation | 200 volts in 0.01% $H_3PO_4$ at 90° C. |
| Test | 140 volts in 10% $H_3PO_4$ at 25° C. after 2 minute electrification |
| % Shr (diameter) | 6.16% |
| cv/gram | 4,824 |
| dcl - ($\mu a/\mu fd$ − v) × $10^{-5}$ | 11.68 |
| $\mu a/g$ | 0.56 |
| Equivalent series resistance | 2.46 |
| Sinter Temperature/Time | 1900° C./30 minutes |
| Anode Weight, Size and Pressed Density | 2.0 gram, 0.258" diameter, 7.0 g/cm$^3$ |
| Formation | 270 volts in 0.01% $H_3PO_4$ at 90° C. |
| Test | 240 volts in 10% $H_3PO_4$ at 25° C. after 2 minute electrification |
| % Shr (diameter) | 8.5% |
| cv/gram | 3,982 |
| dcl - ($\mu a/\mu fd$ − v) × $10^{-5}$ | 49.94 |
| $\mu a/g$ | 1.99 |
| Equivalent series resistance | 4.2 |
| Sinter Temperature/Time | 1900° C./30 minutes |
| Anode Weight, Size and Pressed Density | 3.5 gram, 0.258" diameter, 7.0 g/cm$^3$ |
| Formation | 270 volts in 0.01% $H_3PO_4$ at 90° C. |
| Test | 240 volts in 10% $H_3PO_4$ at 25° C. after 2 minute electrification |
| % Shr (diameter) | 8.35% |
| cv/gram | 3,973 |
| dcl - ($\mu a/\mu fd$ − v) × $10^{-5}$ | 60.16 |
| $\mu a/g$ | 2.41 |
| Equivalent series resistance | 2.63 |

Thus, it will be appreciated that the mixed platelet/granular powder composition of FIG. 3 is well suited to manufacture of capacitor anodes for lower cv/gram applications at high formation voltages, and to high-weight anodes. The powder of FIG. 2 extends the cv/gram levels attainable at high formation voltages. The all-platelet powder of FIG. 1 provides good high voltage properties, as well as gives high cv/gram values for low voltage applications competitive with those of high-charge sodium-reduced powders.

The invention claimed is:

1. An ingot-derived unagglomerated tantalum powder composition comprising a platelet tantalum powder having an average Fisher sub-sieve particle size of less than two micrometers, a Scott density not greater than about 30 g/in$^3$ and a BET surface area of at least about 0.7 m$^2$/g.

2. The powder set forth in claim 1 wherein said Fisher sub-sieve size is in the range of about 0.6 to 1.1 micrometers, and said BET surface area is in the range of about 0.76 to 1.44 m$^2$/g.

3. An ingot-derived agglomerated tantalum powder composition comprising a platelet tantalum powder having a Fisher sub-sieve size of about two micrometers, a Scott density of about 13.5 g/in$^3$, and a BET surface area on the order of 0.44 m$^2$/g.

4. The powder set forth in claim 3 wherein said Scott density is in the range of about 18 to 27 g/in$^3$.

5. An ingot-derived agglomerated tantalum powder composition comprising a granular tantalum powder of tetrahedral morphology and at least 25 w/o platelet tantalum powder having a Fisher sub-sieve particle size of not more than 2.0 micrometers and a BET surface area of at least 0.43 m$^2$/g, said composition having a Scott density of at least about 25 g/in$^3$, a composite Fisher sub-sieve size of at least about 2.0 micrometers and an oxygen content of not more than about 2000 ppm.

6. A method of forming platelet tantalum powders comprising the steps of:
    (a) providing an ingot-derived precursor tantalum powder, and
    (b) ball-milling said precursor powder for a time sufficient to form a platelet power having an average FSSS of less than about 2 micrometers, a Scott density not greater than about 30 g/in$^3$ and a BET surface area of at least 0.7 in$^2$/g.

7. The method set forth in claim 6 comprising the additional step, prior to said step (b), of milling said precursor in a slurry which includes 1-1-1 trichloroethane.

8. The method set forth in claim 7 wherein said precursor powder has an FSSS of about 1.7 to 3.1 micrometers.

* * * * *